Figure 1:
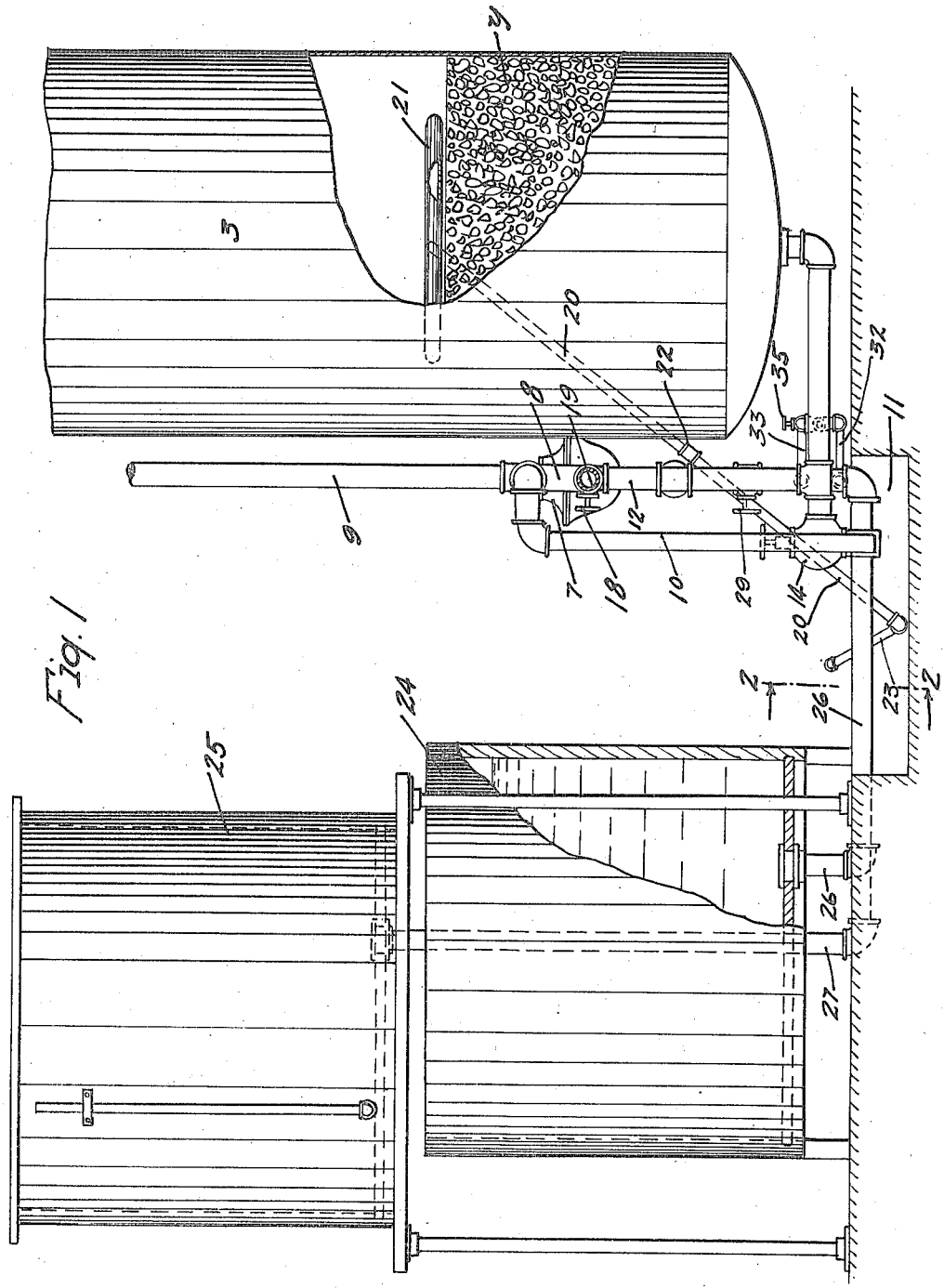

UNITED STATES PATENT OFFICE.

GEORGE H. UECKE, OF MINNEAPOLIS, MINNESOTA.

WATER-SOFTENING APPARATUS.

1,255,359.          Specification of Letters Patent.          Patented Feb. 5, 1918.

Original application filed February 19, 1917, Serial No. 149,391. Divided and this application filed March 21, 1917. Serial No. 156,306.

*To all whom it may concern:*

Be it known that I, GEORGE H. UECKE, a citizen of the United States, residing at Minneapolis, in the county of Hennepin and State of Minnesota, have invented certain new and useful Improvements in Water-Softening Apparatus; and I do hereby declare the following to be a full, clear, and exact description of the invention, such as will enable others skilled in the art to which it appertains to make and use the same.

My invention has for its object to provide an improved apparatus for use in softening water, and is especially designed for carrying out the improved process of softening water disclosed and claimed in a companion application filed by me dated February 19th, 1917, S. N. 149,391, and entitled Process of softening water.

It is a well known fact, that hard water may be softened by passing the same through a material known as zeolite. This material, as a base, contains sodium, and the water is softened thereby without rendering the same caustic. This zeolite, in the above chemical action, supplies sodium which is left in the softened water in an amount chemically equivalent to the calcium and magnesium removed from the original crude or hard water.

The zeolite, from time to time, is regenerated or restored to normal condition and strength by passing therethrough, a solution of sodium chlorid or common salt, and may be thus repeatedly regenerated or put back into condition for repeated softening actions on the water passed therethrough.

Figure 2:
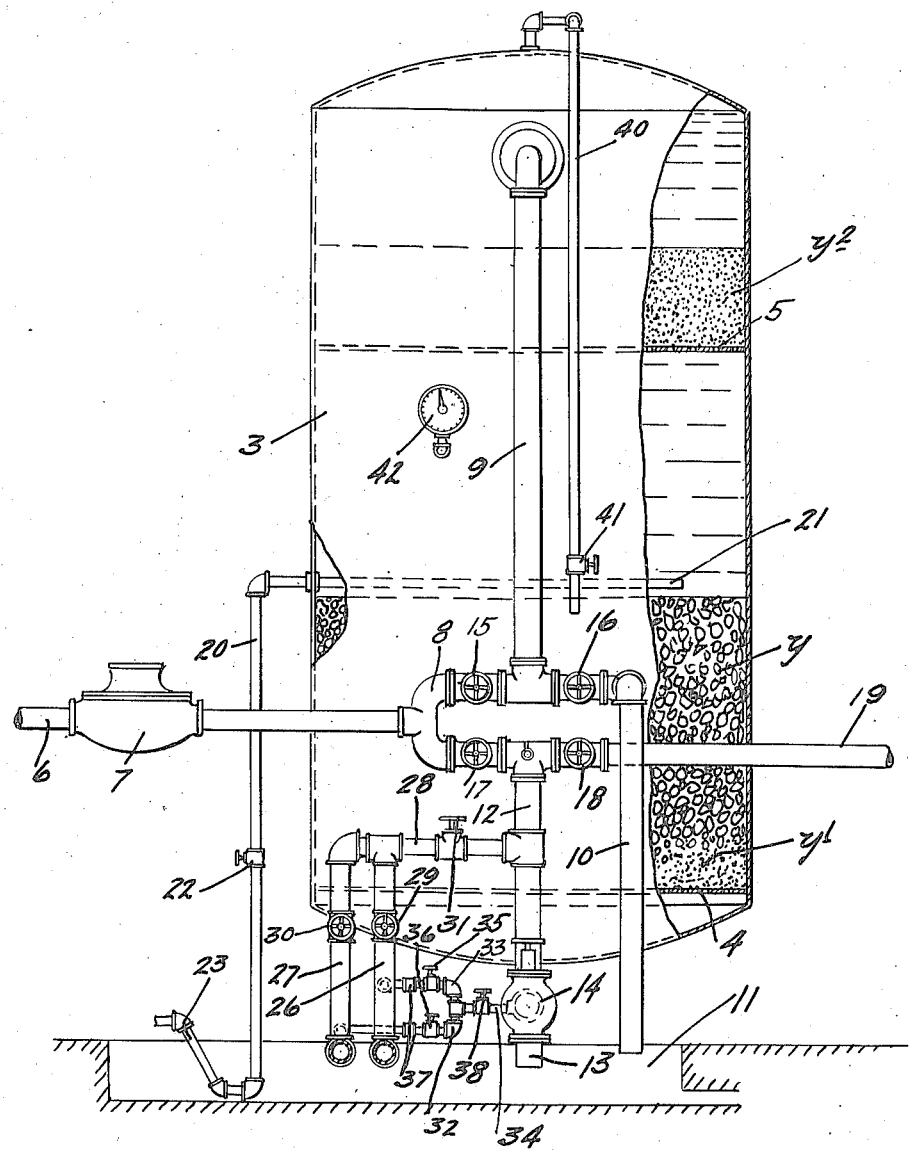

The preferred form of the apparatus is illustrated in the accompanying drawings, wherein like characters indicate like parts throughout the several views. Referring to the drawings:

Figure 1 is a side elevation of the apparatus, some parts being broken away and some parts being sectioned; and Fig. 2 is a section on the line 2—2 of Fig. 1, some parts being broken away and some parts being sectioned.

The apparatus, as preferably described, acts both as a filter and as a water softener, and the receptacle in which these actions take place is preferably, and as shown, in the form of a large upright metal so-called filtering tank 3 closed at both ends and made fluid tight. The zeolite, which is a granular or finely divided material, and which is indicated by the character $y$, in the drawings, is contained in the lower portion of the tank 3. and is supported above the bottom thereof by a fine meshed partition or false bottom 4. This zeolite is placed in the lower portion of the tank and, preferably considerably less than half fills the same. Immediately on the upper surface of the partition 4, a layer of gravel $y^1$ is preferably placed at the bottom of a body of zeolite $y$.

The filtering material $y^2$, which may be marble chips, is contained in the upper portion of the tank 3 and is supported on a perforated horizontal partition 5. The water to be filtered is supplied to the tank through a supply pipe 6 which may be assumed to be connected to city water under pressure. As shown, a water meter 7 is interposed in said supply pipe. In the form of the apparatus illustrated in the drawings, this supply pipe 6 is connected to a U-shaped tube or pipe 8, the upper prong of which is connected to the upper portion of the tank 3 by a pipe 9. The said upper prong of the U-tube 8 is also connected to a back motion drain pipe 10, that discharges to a pit or sewer connection 11 or elsewhere. The lower prong of the said tube 8 is connected to the bottom of the tank 3 by a pipe 12. The lower portion of this pipe 12 has a projecting drain 13 normally closed by a valve 14. In the U-tube or pipe 8 are four valves, 15, 16, 17 and 18, which perform functions to be hereinafter described. The casing of the valve 18 is connected to a pipe 19 through which the softened water is delivered from the tank.

Immediately overlying the upper surface of the body of zeolite $y$, is the upper extremity of a so-called siphon tube or draw-off pipe 20. The inner end of the said pipe 20 is preferably made in the form of an annular tube 21 that is perforated at its under surface, and the pipe 20 has a normally closed valve 22. The lower end of the said pipe 22 is turned upward at 23 and, as shown, is arranged to discharge into the drain pit 11.

The numerals 24 and 25 indicate brine tanks, the latter of which is supported above the former. Brine tubes or pipes 26 and 27 lead, respectively, from the bottom of the tanks 24 and 25 and are connected by a common pipe 28 to the upper portion of the pipe 12. The said pipes 26, 27 and 28 are provided, respectively, with valves 29, 30 and 31. Small pipes 32 and 33 lead, respectively, from the pipes 26 and 27 from points below their valves, and these two small pipes are connected by a common small pipe 34 to the lower portion of the pipe 12. Said pipes 32 and 33 are provided with valves 35 and 36, respectively, and with check valves 37, which permit flow from left to right, in respect to Fig. 2, but will check reverse flow. Pipe 34 is provided with a valve 38.

The numeral 40 indicates an air relief tube or pipe that extends from the top of the tank 3 and is provided with a normally closed valve 41. The valve 41 will be closed at all times except when the tank 3 is being either emptied or filled. Otherwise stated, pipe 40 is closed under all normal operating conditions of the apparatus. The numeral 42 indicates a pressure gage applied to the tank 3.

When water is to be run through the apparatus for the purpose of softening the same, valves 15 and 18 must be opened and all of the other valves of the apparatus must be closed; and the water will then run from supply pipe 6 through portion of U-pipe 8, and through pipe 9 to the top of the filtering tank 3. This water is fed first downward through the filtering material $y^2$, and from thence, on downward through the zeolite, to the bottom of the tank, and from thence out through pipes 12 and 19. The filter takes out the dirt or other solid foreign particles from the water, and while it is desirable, is not in all cases an indispensable feature.

After the zeolite has been exhausted or depleted to such an extent that it needs regeneration to restore it to normal condition, it is desirable, at least at certain times, to back wash the same and the filtering material; and to accomplish this, valves 17 and 16 should be opened and all of the valves of the apparatus closed. When this is done, the water, under pressure from the supply pipe 6, will flow through portion of U-pipe 8 and through pipe 12 to bottom of the tank, and from thence, will be driven up through the zeolite and through the filtering material and out through pipe 9, a portion of U-pipe 8 and water drain pipe 10. Valves 16 and 17 should now be closed.

The next action is to run the brine contained in the tanks 24 and 25 into the filtering tank 3, and this is accomplished in a new and highly important manner, to wit, instead of being run downward through the zeolite, as has hitherto been the practice, it is delivered into the bottom of the tank and caused to rise through the said zeolite. Highly important actions result from this manner of delivering the regenerating fluid to the zeolite. To cause the brine to flow from the said tanks 24 and 25 into the bottom of the filtering tank 3, valves 35, 36 and 38 of pipes 33, 32 and 34, respectively should be opened, and valve 22 of the siphon tube 20 should be opened. In this way, both tanks 24 and 25 may be simultaneously connected to the bottom of the filtering tank 3; but it has been found in practice that the liquid from upper tank 25, will flow into the filtering tank before the brine will commence to flow thereinto from the lower tank. This is partly due to the greater elevation of tank 25, but is also due to the fact that pipes 20, 33 and 34 have substantially the same conducting capacity. Here it may be also stated that the brine in the upper tank will not be as strong as the brine in the lower tank. For example, the brine in the lower tank will usually be about ten per cent. salt solution. Each of the tanks 24 and 25 will preferably contain approximately enough brine to fill the filtering tank to the level of the top of the zeolite $y$, but the lower tank will usually be provided with brine, a little in excess of that just stated.

The relatively weak brine from the upper tank will flood the zeolite and start the regeneration, and in fact, effect a very considerable part of said regeneration by supplying the sodium thereto. As this brine flows gradually into the filtering tank and rises very slowly from the bottom toward the top of the zeolite, it drives out of the tank, through the siphon tube 20, the water which it displaces from between the particles of the zeolite, without disturbing or moving the water in the top of the tank. At this time, of course, the supply of water under pressure to the top of the filtering tank is cut off. Here it is important to note that the raised lower end of the siphon pipe 20 is below the bottom of the lower tank 24. This is important, for otherwise, it would be impossible to completely drain the said lower tank. If, for example, the lower end of the said siphon tube 23 were raised to the center of the lower tank, then it would be impossible to drain the said lower tank below that point.

In the arrangement shown, the lower or discharge end of the siphon tube 20 constitutes the extremity of one leg, and the top of the upper tank 25, the extremity of the other leg of the siphon. The purpose of turning up the lower end of the siphon tube 20 is to form a water trap therefor.

The perforated head 21 of the siphon pipe 20 not only takes the brine from numerous points, but takes it from a level immediately above the zeolite, and not from the upper part of said tank. When the stronger brine from the lower tank 25 begins to run into the bottom of the filtering tank, it will displace and force upward the initial charge of brine from the tank 25 and cause the devitalized portion thereof to flow out through the siphon tube 20; but here it is important to state that the outgoing liquid representing this initial charge of brine from the upper tank 25, will not be a salt or sodium solution. On the contrary, it will have given up its sodium to the zeolite and taken from the zeolite, lime and magnesium. At first, this discharge solution will show but small trace of calcium chlorid or lime and magnesium, but it will gradually grow stronger and stronger with these substances, and finally commence to show trace of salt or sodium chlorid. The last of the solution discharged through the siphon pipe 20 and replaced by brine from the lower tank 24, running into the filtering tank, will be practically pure or very good brine solution, but very little of this will be wasted by discharge through the said siphon pipe.

The valve 38 will be preferably set so that it will require six or eight hours for the contents of the brine tank 25 to run through and the contents of the brine tank 24 to run into, and a little thereof, run through the said filtering tank. When this has been accomplished, the zeolite will have been regenerated, but the said tank will still contain the charge of brine which must be removed therefrom before the apparatus can be again used for softening the water. The pipes 32 and 33 with their check valves 37 are desirable for several reasons. The pipes which deliver from the several brine tanks, at different elevations, to the filtering tank should have check valves to prevent the elevated brine tank from flooding the lower brine tank. These check valves could not be put in pipes 26 and 27, because the brine must be delivered backward from the filtering tank to the brine tanks and check valves would prevent this flow. Moreover, the pipes which deliver the brine from the filtering tank to the brine tanks should be much larger than those that deliver from brine tanks to the filtering tanks, because the first noted flow should be very rapid, as compared with the latter noted flow. Hence, as is obvious, the utility of the pipes 32 and 33, with their check valves 37, as well as the pipes 26 and 27.

In apparatus for softening water hitherto used, the brine remaining in the tank, after the zeolite has been regenerated, has been discharged and wasted; but with this improved apparatus, it is saved and used over again, by running the same back into one or the other or both of the brine tanks, or into some suitable receptacle, from which it may be thereafter returned and again used on the zeolite.

As an initial step to the salvage of the brine, as above stated, valves 35, 36 and 38 are first closed, while valve 22 of the siphon pipe 20 is still open, and water supply valve 15 is open slightly, for a very short time, and water is allowed to run into the top of the filtering tank, so as to force off water contained immediately above the zeolite, and which, because of the affinity of water for calcium chlorid, will absorb more or less of the latter during the regenerating process. After this washing-out action has been accomplished, valve 22 is closed, valve 15 is left open, and valves 29 and 31 are opened; and when this is done, the downward pressure of the water will force the relatively heavy brine downward and from the bottom of the filtering tank through pipes 12, 28 and 26, to lower brine tank 24. It has been found that the brine at the bottom of the tank will be stronger than that farther up; this is the reason for first delivering the brine back into the lower brine tank. When lower tank 24 has been nearly filled, valve 29 is closed and valve 30 is opened, so that the remainder of the brine will be delivered into the said upper brine tank 25. In practice, it has been found that the upper tank 25 will be about three-fourths filled with the brine water before the water loses all but a mere trace of salt. At or about this time additional salt may be put into the lower tank 24 to restore it to its original strength.

After the above has been accomplished, valves 30 and 31 are closed. To remove the remaining traces of salt from the water in the bottom of the filtering tank, valve 14 is open for a few moments and then again closed. Then when valve 18 is opened, the apparatus is again set into action and the water delivered therethrough and, through the zeolite, will be softened by the chemical action already noted.

The above described arrangement whereby the regenerating fluid is forced upward rather than downward through the zeolite, makes it possible to reclaim the sodium or salt solution, which otherwise, and which hitherto has been wasted in apparatus of this general character. The sodium or salt solution or brine is, of course, heavier than pure water, and will remain in a sort of a layer below the pure water, thus rendering it possible to carry out the various important steps above described. Moreover, other important actions result from this upward delivery of the salt solution. For instance, under a slow rise or a rapid rise, for that matter, the brine will maintain a level upper surface and will evenly regenerate all of the particles of the zeolite; whereas, under a downward delivery, being heavier than pure water, will form eddies or currents in the pure water with a result, as has been demonstrated in practice, that the regeneration will not be even throughout the body of zeolite. This apparatus is especially designed for the softening of water by the use of zeolite, either natural or artificial, but is capable of use, regardless of whether the softening material is, or is not, a substance chemically describable as zeolite. Zeolite is the only material at present known to me which can be used, but it is possible that there are other materials that will have the desired softening action on water and capable of being regenerated by the action of the brine or other regenerating liquid.

The so-called filter $y^2$ in the upper portion of the filtering tank may be of a coarse material having for its principal purpose, to prevent any of the particles of the zeolite from being backwashed from the tank. The zeolite itself, acts as a filter and may be of finer material than that of the filter $y^2$.

In the apparatus illustrated, the so-called filtering tank is a closed water receptacle, but in some instances, it may be an open receptacle. In fact, I contemplate a form of the apparatus wherein the water receptacle will be a large reservoir, such as would be used, for example, in a municipal filtering plant.

The discharge or lower end of the so-called drain pipe 20 should not only terminate below the bottom of the lower brine tank, but should terminate above the lowest point of the pipe 26 or connection between the brine tank and the softening tank or filter, so as to prevent complete draining of said pipe 26. If the pipe 26 were drained, air would be admitted into the bottom of the tank 3 and, bubbling upward therethrough, stir up and mix the regenerating fluid and pure water, and also would let water run out from the top of the tank.

From what has been said, it will, of course, be understood that a multiplicity of brine tanks, while desirable, is not necessary in all cases. The brine tanks may be located at various elevations, in respect to the tank 3. For example, such a tank may be located higher up than the uppermost brine tank 25, or considerably lower than the lower brine tank 24, and still the brine would be caused to flow from such brine tank into the filtering tank 3, provided the discharge end of pipe 20 be located below the said brine tank.

The above described is the preferred manner of using the apparatus, but it is capable of use in some other slightly different ways. For instance, after the zeolite has been exhausted, the water from the tank 3 will be drained and then the brine caused to flow and rise upwardly through the substantially dry zeolite. To effect the above action by gravity, it would be necessary for the brine tank to be located above the upper surface of the zeolite.

What I claim is:

1. In an apparatus of the kind described, the combination with a water receptacle containing a water softening substance, said receptacle having connections for the circulation of water through said softening substance, of a brine tank for containing a regenerating liquid, said tank having connections to the lower portion of said water receptacle for the delivery of the regenerating liquid in a rising column upward through said water softening substance, and a drawoff tube independent of said water circulating and brine delivery connections, leading from said water receptacle and having its receiving end in the vicinity of the upper surface of said water softening substance.

2. In an apparatus of the kind described, the combination with a water receptacle containing a water softening substance, said receptacle having connections for the circulation of water through said softening substance, of a brine tank for containing a regenerating liquid, said tank having connections to the lower portion of said water receptacle for the delivery of the regenerating liquid in a rising column upward through said water softening substance, and a drawoff tube independent of said water circulating and brine delivery connections, leading from said water receptacle and having its receiving end in the vicinity of the upper surface of said water softening substance, the said water receptacle being a closed tank and the delivery end of said drawoff tube extending to a point below said brine tank, whereby said drawoff tube constitutes the relatively long leg of a siphon, when the said water receptacle is closed and said brine delivery connections opened and serves as a discharge pipe, when said brine delivery connection is closed and said water supply connection opened.

3. An apparatus of the kind described comprising a water receptacle containing a water softening substance, connections to said receptacle for the delivery of water through said softening substance, a brine tank, connections for delivery of the brine from said tank to the lower portion of said water receptacle and vice versa, and a valved drawoff tube independent of said water and brine delivery connections and operative to control a discharge from said water receptacle either when said water supply connection is closed and said brine delivery connection open or when said brine delivery connection is closed and said water supply connection is open.

4. An apparatus of the kind described comprising a water receptacle containing a water softening substance, connections to said receptacle for the delivery of water through said softening substance, a brine tank, connections for delivery of the brine from said tank to the lower portion of said water receptacle and vice versa, and a valved drawoff tube independent of said water and brine delivery connections and operative to control a discharge from said water receptacle either when said water supply connection is closed and said brine delivery connection open or when said brine delivery connection is closed and said water supply connection is open, said brine tank being open to atmospheric pressure and the said drawoff pipe having its delivery end below said brine tank.

5. In an apparatus of the kind described, the combination with a water receptacle containing a water softening substance, said receptacle having connections for the circulation of water to said softening substance, of a brine tank open to atmospheric pressure and having a valve connection to the lower portion of said water receptacle for the delivery of brine thereto, and a valved drawoff tube leading from said water receptacle, said drawoff tube having its receiving end in the vicinity of the upper portion of the upper surface of said softening material and having its lower end formed with an upturned portion constituting a water seal but delivering below said brine tank.

6. In an apparatus of the kind described, the combination with a water receptacle containing a water softening substance, said receptacle having connections for the circulation of water to said softening substance, of a brine tank open to atmospheric pressure and having a valve connection to the lower portion of said water receptacle for the delivery of brine thereto, and a valved drawoff pipe leading from said water receptacle, said drawoff pipe having its receiving end in the vicinity of the upper portion of the upper surface of said softening material and having its lower end arranged to discharge at a point below said brine tank, but above the lowest part of the brine delivery connection between said tank and water receptacle.

7. An apparatus of the kind described, comprising a water receptacle containing a water softening substance, a water supply connection leading to the upper portion of said receptacle, a water discharge connection leading from the lower portion of said receptacle, a brine tank, connections for delivery of brine from said tank to the lower portion of said water receptacle, and vice versa, and a valved drawoff tube, independent of said water and brine delivery connections, having a receiving end opening from said water receptacle at a point above the body of said softening substance and below the said water delivery connection to the upper portion of said receptacle, the discharge end of said drawoff tube being below said brine tank.

8. An apparatus of the kind described comprising a water receptacle containing a water softening substance, connections to said receptacle for the delivery of water through said softening substance, a brine tank, connections for delivery of the brine from said tank to the lower portion of said water receptacle, and vice versa, and a valved drawoff tube independent of said water and brine delivery connections and operative to control a discharge from said water receptacle either when said water supply connection is closed and said brine delivery connection open or when said brine delivery connection is closed and said water supply connection is open, and a valved air vent open from the top of said water receptacle, said air vent being independent of said drawoff tube and water and brine circulating connections.

9. In an apparatus of the kind described, the combination with a closed receptacle containing a water softening substance, said receptacle having connections for the circulation of water through said softening substance, of a plurality of brine tanks at different elevations having connections to the bottom of said closed water receptacle for the delivery of the regenerating liquid in a rising column upward through said softening substance.

10. In an apparatus of the kind described, the combination with a closed receptacle containing a water softening substance, said receptacle having connections for the circulation of water through said softening substance, of a plurality of brine tanks at different elevations having connections to the bottom of said closed water receptacle for the delivery of the regenerating liquid in a rising column upward through said softening substance, and a drawoff tube leading from said tank and having its receiving end in the immediate vicinity of the upper surface of said water softening substance.

In testimony whereof I affix my signature in presence of two witnesses.

GEORGE H. UECKE.

Witnesses:
HARRY D. KILGORE,
F. D. MERCHANT.